United States Patent
Krishnamoorthy et al.

(10) Patent No.: US 11,928,501 B2
(45) Date of Patent: Mar. 12, 2024

(54) LIFI-POWERED CONTENT-AWARE LARGE-SCALE DATA PROCESSING FACTORY

(71) Applicant: Bank of America Corporation, Charlotte, NC (US)

(72) Inventors: Madhusudhanan Krishnamoorthy, Chennai (IN); Nithya C, Chennai (IN); Meenakshi Meenakshisundaram, Chennai (IN); Sivasankari Abirami Karthikeyan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 525 days.

(21) Appl. No.: 17/234,854

(22) Filed: Apr. 20, 2021

(65) Prior Publication Data
US 2022/0334871 A1 Oct. 20, 2022

(51) Int. Cl.
| | |
|---|---|
| H04L 7/00 | (2006.01) |
| G06F 9/48 | (2006.01) |
| G06F 21/64 | (2013.01) |
| H04B 10/11 | (2013.01) |
| H04L 67/01 | (2022.01) |

(52) U.S. Cl.
CPC ........... *G06F 9/4881* (2013.01); *G06F 21/64* (2013.01); *H04B 10/11* (2013.01); *H04L 7/0075* (2013.01); *H04L 67/01* (2022.05)

(58) Field of Classification Search
None
See application file for complete search history.

(56) References Cited

U.S. PATENT DOCUMENTS

| | | | |
|---|---|---|---|
| 11,128,376 B1 * | 9/2021 | Passe | H04W 12/082 |
| 2018/0262269 A1 * | 9/2018 | Grevers, Jr. | G02B 5/22 |
| 2018/0316425 A1 | 11/2018 | Katiyar et al. | |
| 2021/0067249 A1 * | 3/2021 | Hull | H04B 10/1143 |

FOREIGN PATENT DOCUMENTS

KR 102158319 6/2016

OTHER PUBLICATIONS

Unverified Machine Translation of KR102158319, Generated by European Patent Office on Apr. 20, 2021.

* cited by examiner

*Primary Examiner* — Darren E Wolf
(74) *Attorney, Agent, or Firm* — Weiss & Arons LLP

(57) ABSTRACT

Systems, methods and apparatus are provided for a reusable, client-server based ecosystem designed to support content-aware, LiFi-powered transfer of large-scale, semi-structured data files. Containerized client-side applications may include a LiFi communication engine (LCE), a job control engine (JCE), and an execution hub that is configured to interface with the JCE, the LCE, job stakeholders and downstream applications. A central server may include a server-side LCE configured for two-way communication with the client-side LCE. Each LCE may be configured to cluster semi-structured data into data packets, broadcast data packets using an LED array, receive data packets using an array of photoreceptors and synchronize received data packets.

12 Claims, 6 Drawing Sheets

US 11,928,501 B2

LIFI-POWERED CONTENT-AWARE LARGE-SCALE DATA PROCESSING FACTORY

FIELD OF TECHNOLOGY

Aspects of the disclosure relate to LiFi-powered transmission of large-scale, semi-structured data files, such as XML files.

BACKGROUND OF THE DISCLOSURE

Data transmission of large XML-format files presents a range of technical challenges. XML stands for Extensible Markup Language. An XML file uses a tag-based language to create a structured summary of a feed source. The combination of structured and unstructured data often results in transmission errors and file corruption. The size of the files increases the likelihood of error and limits the speed of the transfer. Slow transfer times may lead to repeated timeouts and render the transfer more vulnerable to attack.

Conventional file transmission methods include various forms of wired connective infrastructure or wireless transfer via wireless fidelity (WiFi). WiFi transmission uses radio frequency to induce a voltage in an antenna to transmit data.

Light Fidelity (LiFi) technology offers a number of advantages for transfer of large files. LiFi is a light-based communication system capable of transmitting data wirelessly at high speed using light emitting diodes (LEDs). LiFi transmission speeds may be more than one hundred times faster than conventional WiFi. LiFi infrastructure is also relatively simple, in contrast with the radio transmitters and antennae required for WiFi communications.

The speed of LiFi transfer may enable real-time parallel processing of large-scale files, vastly improving processing efficiency. The speed of LiFi transmission may also limit data leakage and thus protect against adversarial attacks during the data transmission process.

It would be desirable to provide a client-server ecosystem that integrates LiFi protocols for transmission of large semi-structured data files. It would be desirable to improve reusability by incorporating containerized client-side applications that could be deployed across a range of platforms. It would be desirable for the client-side applications to be content-aware in order to reduce transmission errors and further improve efficiency.

SUMMARY OF THE DISCLOSURE

Systems, methods, and apparatus for a LiFi-powered, content-aware, large-scale data processing factory are provided.

A client-side LiFi communication engine (LCE) may be configured for two-way client-server communication. The client-side LCE may packetize a semi-structured data file according to LiFi protocols and assign a request identifier. The client-side LCE may broadcast packets of semi-structured data to a server-side LCE via LiFi using an LED array. The client-side LCE may receive processed data from a server-side LCE via LiFi using an array of photoreceptors. The client-side LCE may synchronize the received processed data using the request identifier.

The client-side container may include a job control engine (JCE). The JCE may receive a job associated with a semi-structured data file and generate file metadata associated with the job.

The client-side container may include an execution hub configured to interface with the JCE and the LCE. The execution hub may prioritize a job received from the JCE according to the associated metadata.

The client-side container may include quality gates. A first quality gate may validate the size and format of the semi-structured data for compliance with LiFi transmission protocols. A second quality gate may validate the content of the semi-structured data for compliance with LiFi transmission protocols. The second quality gate may extract and validate XML header and trailer nodes.

A central server may perform processing operations on the semi-structured data. The central server may include a server-side LCE configured for two-way communication. The server-side LCE may packetize the processed data according to LiFi protocols. The server-side LCE may broadcast packets of processed data to a client-side LCE via LiFi using an LED array. The server-side LCE may receive semi-structured data from a client-side LCE via LiFi using an array of photoreceptors. The server-side LCE may synchronize the received semi-structured data using the request identifier.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
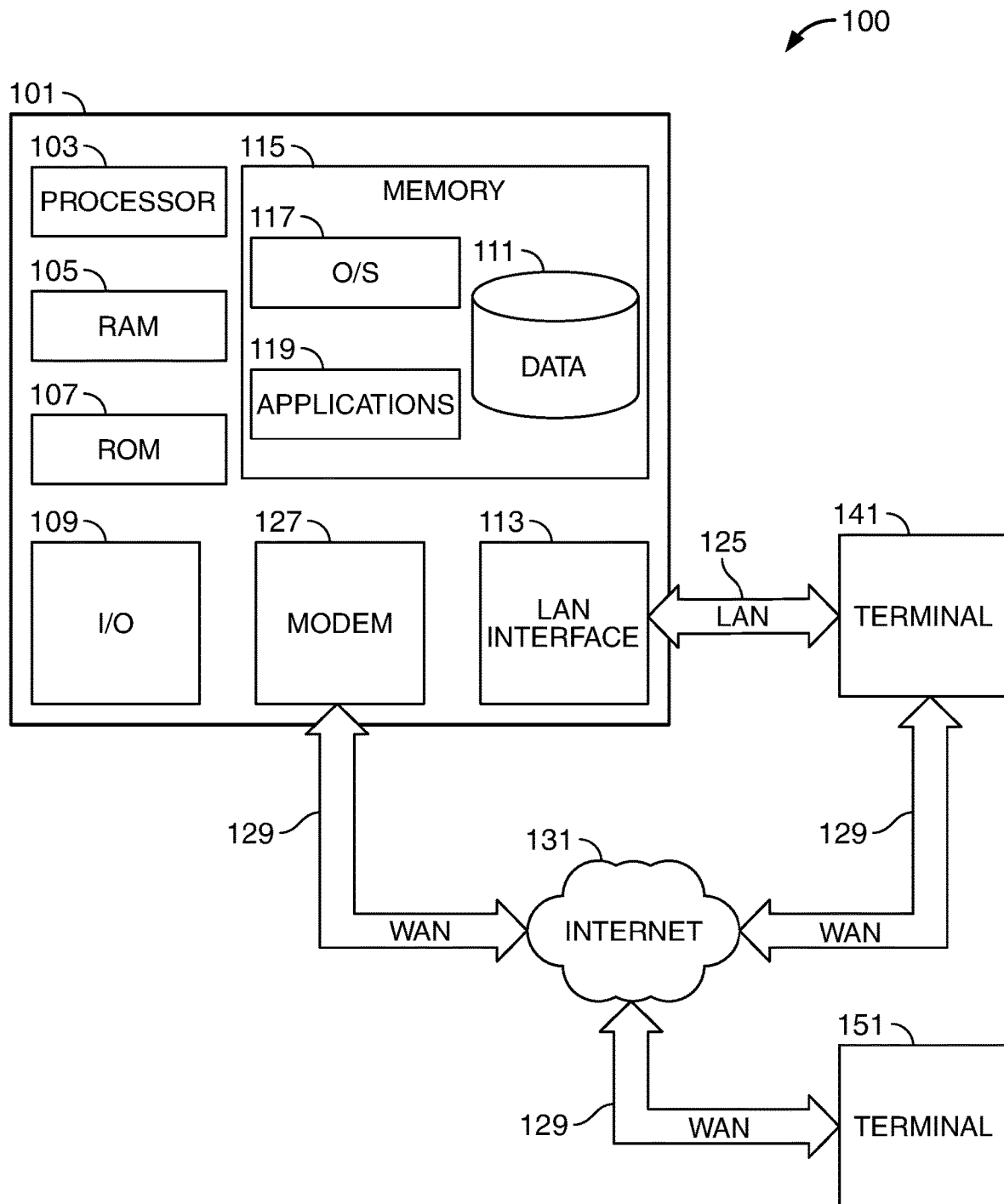
FIG. 1 shows illustrative apparatus in accordance with principles of the disclosure.

Systems, methods and apparatus for a LiFi-powered, content-aware, large-scale data processing factory are provided.

Conventional wireless networking relies on wireless fidelity (WiFi) technology. WiFi transmits data using the radio frequency spectrum.

Light Fidelity (LiFi) is a two-way network protocol for high speed connectivity using light technology. LiFi may capture data in modulated light frequencies. The driver-circuit in LED bulbs may encode and transmit data by switching the LED on and off at rates so fast that the flickering is indiscernible to the human eye. The data may be decoded by an optical sensor on the receiving end and converted back into an electronic data stream. In some embodiments, LED bulbs may be dimmed to levels below human visibility while still emitting enough light to carry data.

LiFi technology presents a number of advantages over conventional WiFi. One advantage is transmission speed. LiFi transfers may occur at speeds 100 times faster than conventional WiFi. Another advantage is capacity. WiFi relies on the radio-frequency spectrum which is subject to congestion and slowing due to high traffic. LiFi, on the other hand, uses the visible light spectrum which is 10,000 times larger than the radio bandwidths and is therefore not limited by spectrum capacity. While WiFi frequencies may eventually become crowded and slower when large amounts of data are transferred, LiFi is able to deliver consistent large data transfers. Additionally, unlike WiFi, LiFi frequencies may be used in electromagnetic sensitive areas without causing interference.

LiFi infrastructure is also relatively simple, in contrast with the radio transmitters and antennae required for WiFi communications. The limited hardware required for LiFi communications also improves energy efficiency.

LiFi technology may provide solutions for processing of large semi-structured data files. Conventionally, real-time processing of XML files greater than typical RAM size has not been practical. A reusable client-server based ecosystem designed to support content-aware LiFi would enable centralized processing of these files.

Centralized processing may reduce overall processing time, latency and cold starts. For large-scale data, a single memory cache may not be able to accommodate the data. Shifting to distributed or parallel processing would require cold start time, as the system would need to perform load balancing for the initial setup before processing could even begin. The LiFi-powered, client-server based ecosystem reduces latency by using packetization and LiFi transmission along with server-based parallel processing to improve processing time.

In some embodiments, the speed of LiFi transfer may allow batch processing to be converted into real-time online processing. The speed of LiFi transmission also limits data leakage and therefore protects against adversarial attacks during the data transmission process.

Conventionally, the combination of structured and unstructured data in XML files often results in transmission errors and file corruption. LiFi transmission may be combined with content-aware operations that preprocess and validate the data to further reduce the risk of file corruption during transmission. Data integrity validation along with subsequent LiFi packetization and synchronization may ensure that high-speed LiFi transmission is integrated with additional safeguards for secure transfer.

For the sake of illustration, the invention will be described as being performed by a "system." The system may include one or more features of apparatus and methods that are described herein and/or any other suitable device or approach.

The system may involve client-server architecture. The system may include one or more client computers. Each client computer may be in communication with a central server. By enabling data transmission for large XML files, LiFi allows for centralized processing at the server side. Centralized processing improves efficiency and enables the re-use of processed data across different architectures.

A client computer may include one or more client-side containers. A container typically encompasses an entire runtime environment. Containerized software may be packaged along with its libraries and dependencies into a single unit. Containers virtualize CPU, memory, storage, and network resources at the OS level, allowing container-based applications to run consistently across many different target platforms. With the incorporation of containerized client-side applications, the client-server based ecosystem may be reusable, for content-aware LiFi transmission across a range of platforms.

The client-side container may include a job control engine (JCE). The JCE may be the primary point of entry for the data factory ecosystem. The JCE may receive a job request. The job request may involve large-scale, semi-structured data files. The files may be XML files. Illustrative job requests may involve data preprocessing such as data cleaning or data transformation or statistical insights such as data aggregation.

The JCE may generate metadata for the job request. Illustrative metadata may include the job objective, the source of the file, and the destination location. The JCE may add metadata indicating priority of the job or the relationship between different parts of a compound job.

The client-side container may include an execution hub. The execution hub may orchestrate job execution. The execution hub may receive incoming job requests from the JCE. The execution hub may interface with a LiFi communication engine (LCE) for data transfer as well as with downstream applications that will make use of the data.

The execution hub may prioritize jobs according to the metadata associated with each job request. The execution hub may monitor job status and update job execution information in an enterprise database. The execution hub may include an exception queue for jobs that are not fulfilled because they do not comply with LiFi transmission parameters. The execution hub may include a message queue service for notifying stakeholders or downstream applications regarding job status. The execution hub may reconcile processed XML data received from the server with the original job requests. The execution hub may generate reports and dashboard information. Illustrative reports may include daily execution trends or metrics evaluating communications.

The JCE may transmit a list of job requests to the execution hub. The execution hub may prioritize the requests based on the metadata generated by the JCE.

The client-side container may include multiple quality gates to ensure that both the format and content of the data is suitable for LiFi transmission. A first quality gate may validate file format requirements. In order to be suitable for LiFi transfer, the data may be required to have a predefined format and a predefined size. For example, LiFi resources may be reserved for files in XML format of 16 GB or larger. The first quality gate may filter out files that do not meet system requirements.

A second quality gate may validate the content of an XML file. The second quality gate may include a processing queue. The second quality gate may validate XML header and trailer nodes for data integrity. The system may check for anomalies or corrupted data using any suitable data quality metric. Extraction of header and trailer nodes is a quick and simple way to access XML file content for validation. Illustrative header and trailer data may include a number of records, a sum of financial amounts, or any suitable summary information.

If the data fails validation at either of the quality gates, the execution hub may store the job in the exception queue. The execution hub may report exceptions to the JCE or to one or more stakeholders.

The client-side container may include a LiFi communication engine (LCE). If the quality gates validate the XML data, the XML data may proceed to the LCE. The LCE may be configured for two-way data communication using LiFi technology.

The LCE may include a packetization component. The packetization component may divide the XML data into data packets for LiFi transmission. The packets may be of equal size or may be broken up according to any suitable method. During packetization, XML data may be clustered based on the job priorities, job type, or business unit where the job originated. For example, a job request may involve hundreds of XML files, each larger than 16 GB. The LCE may use clustering to group the files based on a process identified in the file name, file size, or any sequence-based XML processing within the job.

The LCE may include a broadcasting component. The broadcasting component may control the transmission of data packets using LiFi technology. The LCE may use light intensity or light frequency modulation to encode the data. The LCE may use an array of LEDs, micro-LEDs, or any suitable light source to transmit the data. The invention may also be compatible with light sources emitting light outside the visible spectrum using infrared or ultraviolet frequencies. The LEDs may be switched on and off at rates indiscernible to the human eye. The LEDs may be dimmed to levels below human perception.

The LCE may include a receptor component. The receptors may receive a transmission of the data packets using LiFi technology. The LCE receptors may include an array of photoreceptors capable of detecting the light transmission and converting it to an electronic data stream.

The LCE may include a synchronization component. The synchronization component may confirm the completeness and accuracy of packet transmission. Prior to transmission, the XML data may be assigned a unique request identifier. The LCE may match received data received with this request identifier. Synchronizing received data with the request identifier ensures that all of the packetized data associated with a particular job is reassembled following transmission.

The client-side LCE may communicate with a server-side LCE via the LiFi broadcasting component. The server-side LCE may include the same packetizing, broadcasting, receiving and synchronizing components as the client-side LCE. Server-side LCE receptors may receive the files from the client-side LCE. Server-side LCE synchronization may validate the completeness and accuracy of the transmission using the request identifier.

The server may process the data using a range of business logic applications. For example, the server may provide structure and analysis through ETL, data warehousing, data mining, data quality checks or data analysis.

The server may transmit the processed data to one or more client-side containers via LiFi using the server-side LCE. Server-side LCE packetization may cluster the processed data into data packets and server-side LCE broadcasting may transmit the data packets. The ability to transmit large files using an LCE enables the system to consolidate processing at the server level, improving both processing efficiency and reusability of the processed data.

Client-side LCE receptors may receive processed data from the server-side LCE. Client-side LCE synchronization may validate the completeness and accuracy of the transmission by matching the processed XML data with the request identifier. Exceptions may be transmitted to an exception handler in communication with the execution hub.

Processed data that is successfully transmitted from the server may be sent from the LCE directly to the execution hub. The execution hub may reconcile the processed XML data with the job request to ensure that processed data correlates with the job objectives received from at the JCE. While the LCE synchronizes processed data at the XML file level, the execution hub reconciles the data at the job level. The execution hub message queue may store information about completed jobs. The message service may interact with downstream client applications that will make use of the processed data.

The system may be applied to mainframe jobs. Mainframe jobs are similar to distributed jobs but run from mainframe servers. In some embodiments, the client container may be adapted to interface with mainframe O/S based servers in place of distributed servers.

One or more non-transitory computer-readable media storing computer-executable instructions are provided. When executed by a processor on a computer system, the instructions perform a method for centralized processing of large-scale, semi-structured data files.

The method may include, at a client container, receiving a job request associated with a semi-structured data file and generating file metadata associated with the job. Containerized client-side applications may packetize the semi-structured data by clustering the data based at least in part on the metadata associated with the job. The containerized client-side applications may broadcast the packets of semi-structured data to a server platform via LiFi using an LED array.

The method may include, at a server platform, receiving the packets of semi-structured data using an array of photoreceptors and synchronizing the received packets. The method may include processing the data at the server platform. The method may include using server-side applications to packetize the processed data and broadcast the packets of processed data to the client-side applications via LiFi.

The method may include, at the client container, receiving the packets of processed of processed data from the server platform using an array of photoreceptors and synchronizing the received packets. The method may include reconciling the received processed data with the job request.

Systems, methods, and apparatus in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 is a block diagram that illustrates a computing device 101 (alternatively referred to herein as a "server or computer") that may be used in accordance with the principles of the invention. The computer server 101 may have a processor 103 for controlling overall operation of the server and its associated components, including RAM 105, ROM 107, input/output ("I/O") module 109, and memory 115.

I/O module 109 may include a microphone, keypad, touchscreen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database.

Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, computer 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), authentication services and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that encrypt information, process received executable instructions, interact with enterprise systems, perform power management routines or other suitable tasks. Algorithms may be used to perform the functions of one or more of generating job metadata, validating file data, identifying exceptions, clustering XML data into data packets, broadcasting data packets, receiving data packets, synchronizing data packets, reconciling data, and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
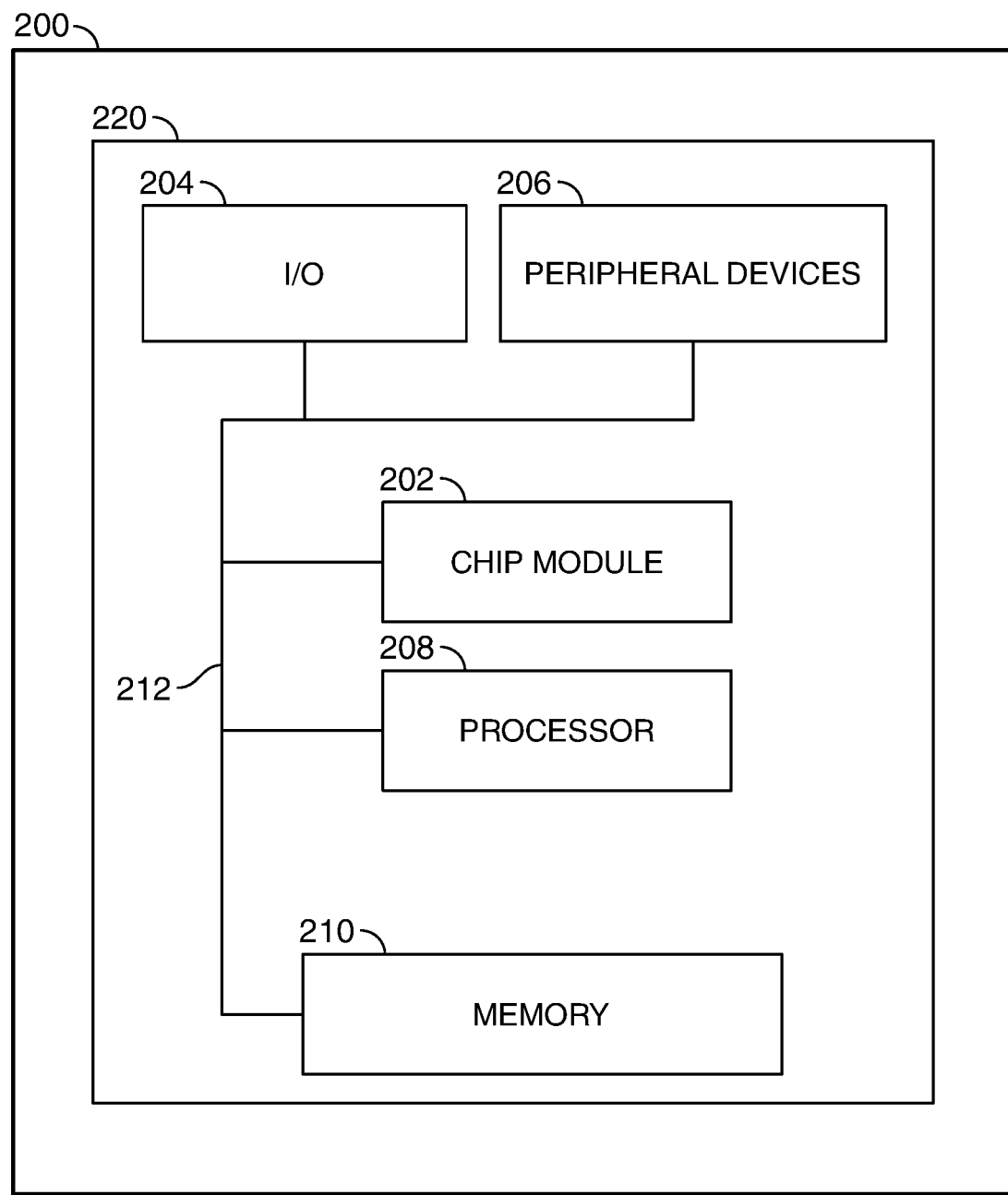
FIG. 2 shows illustrative apparatus in accordance with principles of the disclosure.

FIG. 2 shows an illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may generate job metadata, validate file data, packetize data according to LiFi transmission protocols, and perform other methods described herein; and machine-readable memory 210.

Machine-readable memory 210 may be configured to store in machine-readable data structures: job data, job metadata, job updates, exception data, request identifiers, data packet information, and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
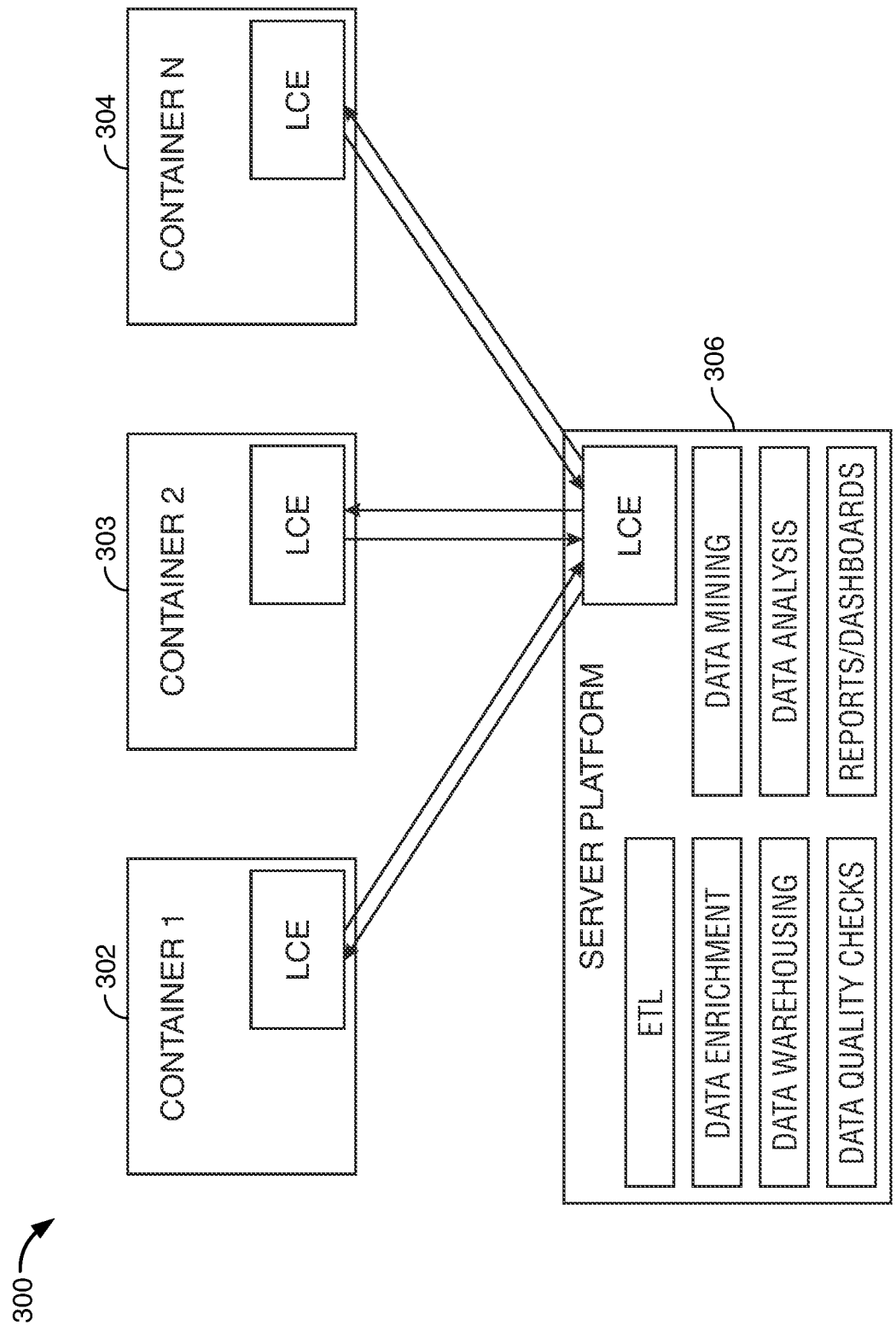
FIG. 3 shows illustrative system architecture in accordance with principles of the disclosure.

FIG. 3 shows high-level system architecture 300. Architecture 300 shows aspects of the reusable client-server based, LiFi-powered ecosystem. The client-side portions of the LiFi-powered ecosystem may be containerized and deployed across a variety of client platforms. Client containers 302, 303 and 304 may each include a client-side LCE. The client-side LCEs may each be configured for two-way communication with a server-side LCE on server platform 306. This arrangement improves efficiency by using LiFi transmission to enable centralized processing of large-scale semi-structured data files.

Figure 4A:
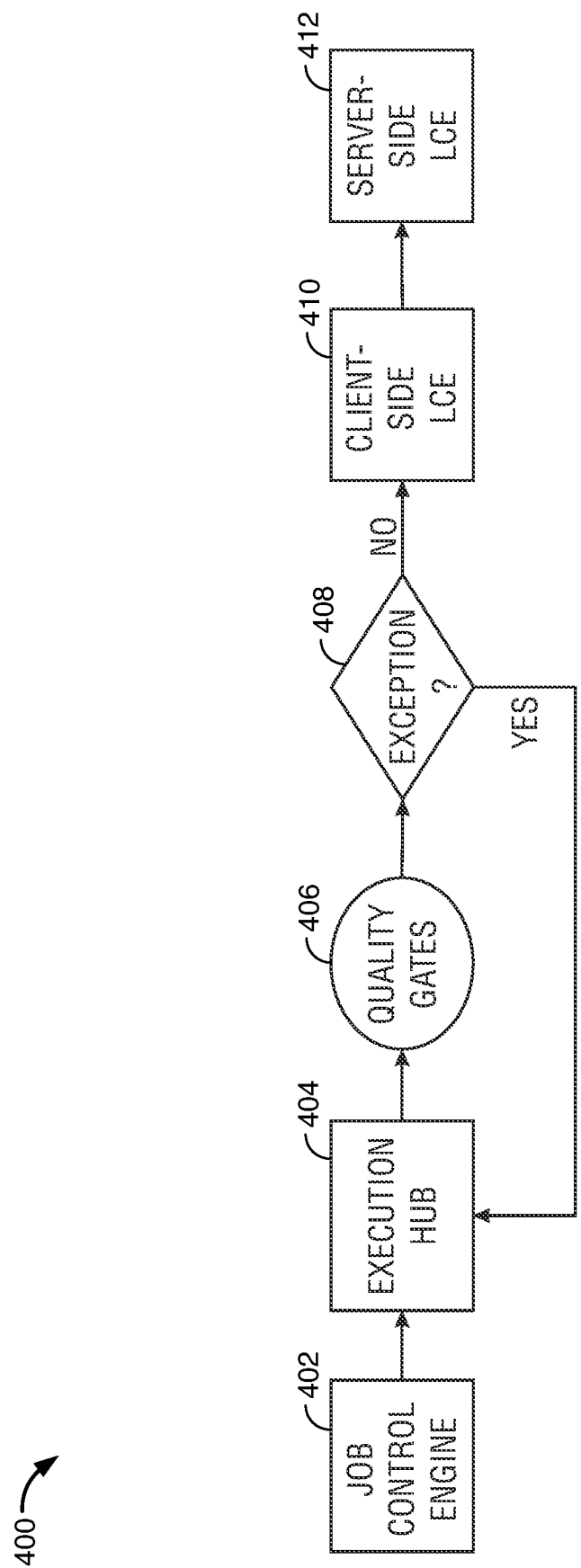
FIG. 4A shows an illustrative process flow in accordance with principles of the disclosure.
Figure 4B:
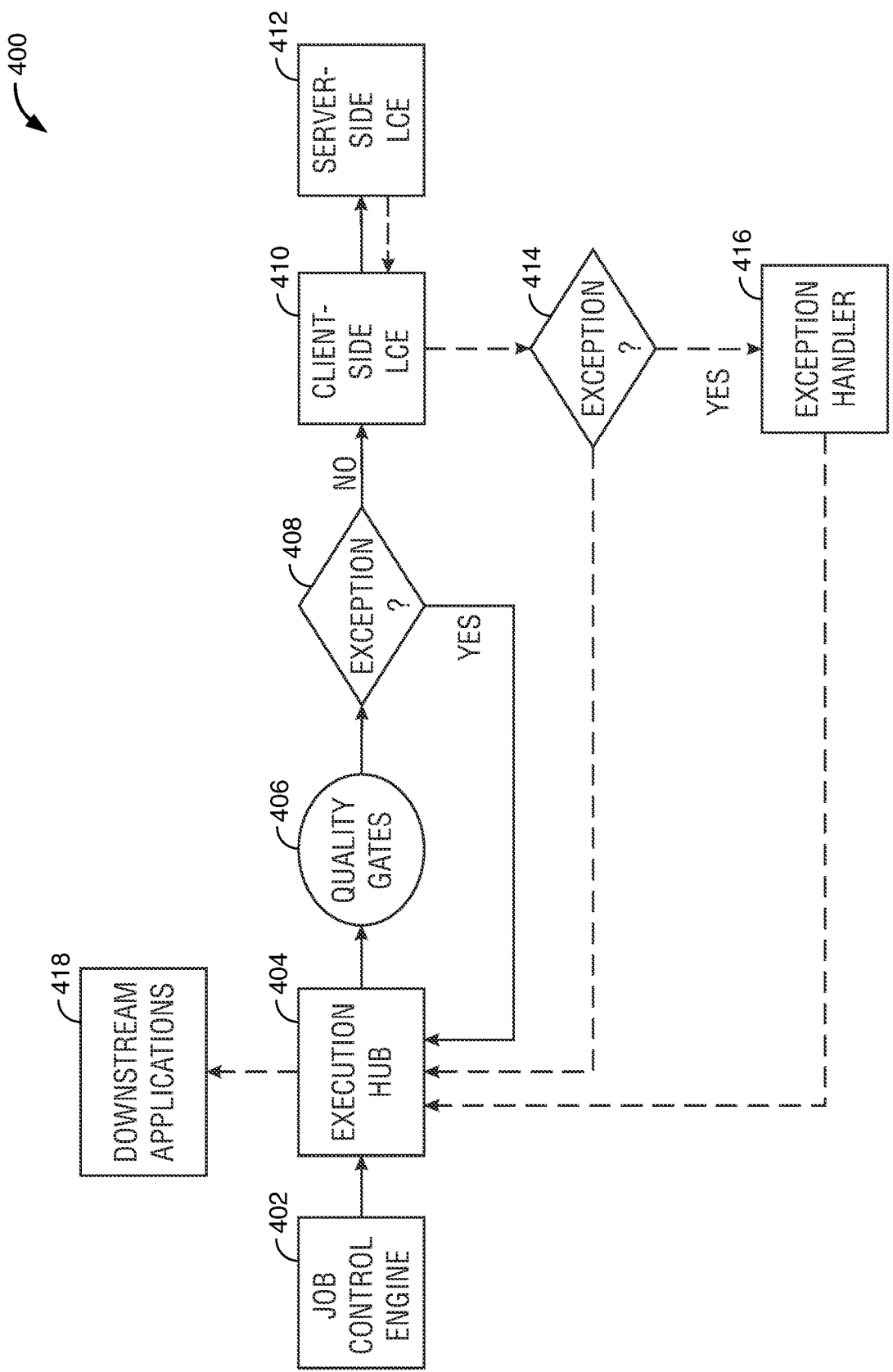
FIG. 4B shows an illustrative process flow in accordance with principles of the disclosure.

FIGS. 4A and 4B show aspects of illustrative process flow 400. Process flow 400 illustrates the flow of information through the client-server based, LiFi-powered ecosystem. Process flow 400 may include one or more features shown in architecture 300.

FIG. 4A focuses on the client-side flow of information. At step 402, a job control engine receives a job associated with a semi-structured data file and generates file metadata associated with the job. At step 404, the job is transmitted to the execution hub. The execution hub may manage the job by assigning priority, sequestering exceptions, reconciling received data with assigned jobs, communicating with applications via a message queue, and generating reports and dashboard updates. At step 406, the file may be validated by one or more quality gates. The quality gates may confirm that file size and format are consistent with LiFi transmission protocols. The quality gates may validate the content of the file to minimize corruption during transfer. At step 408, exceptions may be transmitted to the execution hub and stored in an exception queue. The execution hub may communicate the exception to the job control engine using the message queue. The execution hub may generate a report regarding the exception.

At step 410, a client-side LCE may cluster the semi-structured data into a set of data packets. The client-side LCE may broadcast the data packets according to LiFi protocols using an array of LED bulbs. At step 412, the server-side LCE receives the data packets from the client-side LCE. Server-side LCE photoreceptors may convert the transmission to an electronic data stream for processing. Server-side LCE synchronization may ensure the transmission is complete.

FIG. 4B includes additional elements of process flow 400, showing transmission of processed data from the server-side LCE to the client environment. The data received from the server is shown using a broken line. Steps 402 to 412 of FIG. 4B are the same steps shown in FIG. 4A.

The server platform may perform a range of operations on the semi-structured data received from the client-side LCE. At step 412, the server-side LCE packetizes the processed data and broadcasts it to the client-side LCE using LiFi. The data packets may be received by client-side LED photoreceptors and synchronized to ensure the transmission is complete. At step 414 exceptions may be identified. If there is no exception, the processed data may transmitted directly to the execution hub. The execution hub may reconcile the processed data with job objective information. The execution hub may post information about the completed job on the message queue. If an exception is identified, the processed data may be transmitted to exception handler 416. Exception handler 416 may communicate the data to the execution hub.

Figure 5:
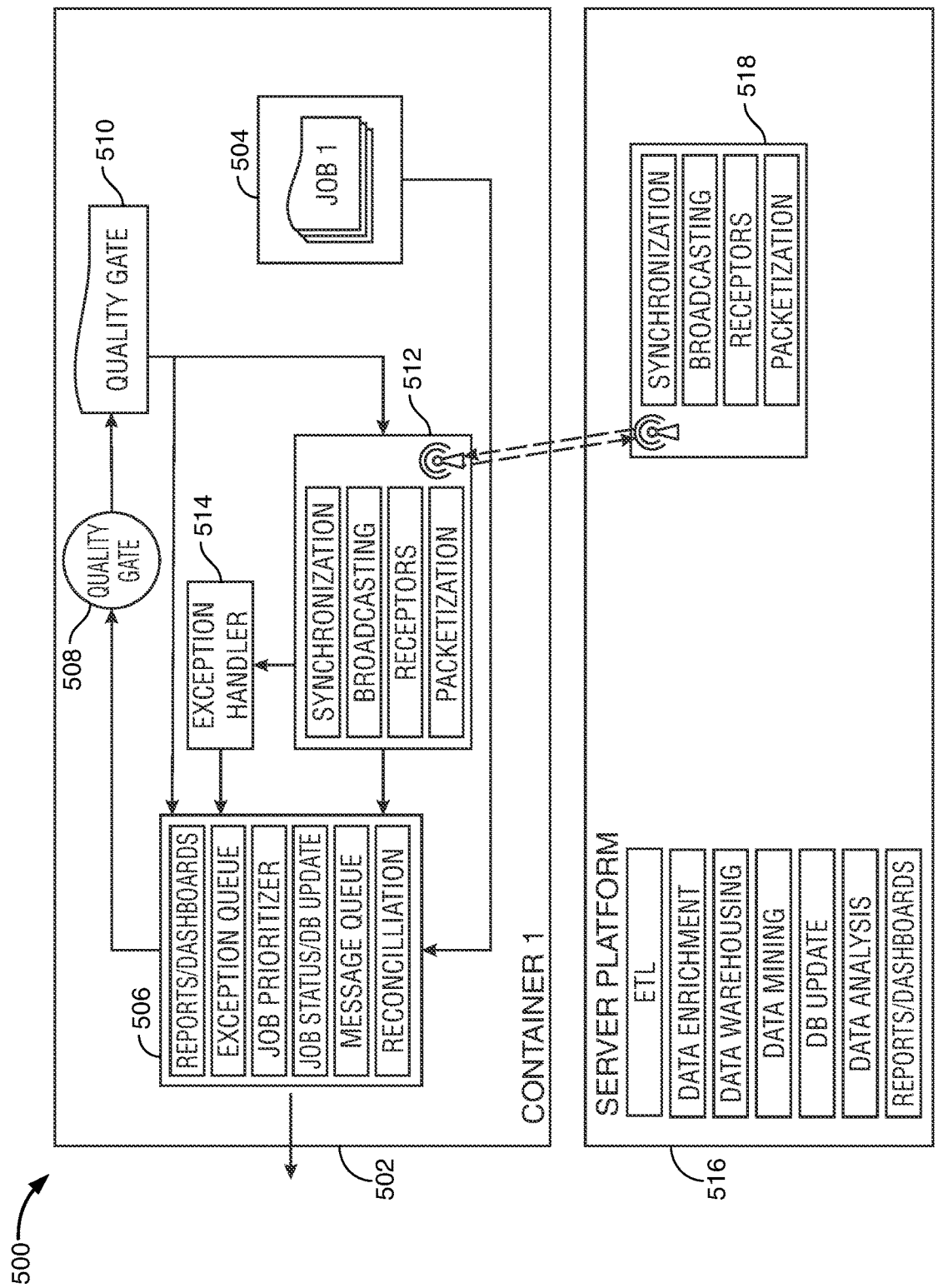
FIG. 5 shows illustrative system architecture in accordance with principles of the disclosure.

FIG. 5 shows illustrative system architecture 500 for a reusable client-server based, LiFi-powered ecosystem. Elements of system architecture 500 may correspond to elements shown in system architecture 300 and process flow 400.

Client container 502 may be deployed on a client computer. Job control engine 504 may receive a job associated with a semi-structured data file. job control engine 504 may transmit the job to Exception Hub 506.

Exception Hub 506 may prioritize the job using the job prioritizer. Exception Hub 506 may transmit the file to quality gate 508. Quality gate 508 may filter files based on file size and file format. Quality gate 510 may validate the content of the file using any appropriate data metric. Files that fail validation may be transmitted back to the execution hub and stored in the exception queue.

Files validated by quality gate 510 be transmitted to client-side LCE 512. Client-side LCE 512 may packetize the semi-structured data and broadcast the data packets using LiFi technology.

Server platform 516 may provide centralized processing for data received from multiple client-side LCEs. Server-side LCE 518 may receive the data packets from client-side LCE 512 using an array of photoreceptors.

Server platform 516 may perform processing operations on the received data. Server-side LCE 518 may cluster the processed data into data packets and broadcast the processed data to client-side LCE 512 via LiFi.

Client-side LCE 512 may receive the processed data using LiFi receptors. Client-side LCE 512 may synchronize the processed data at the XML level using a request identifier. Client-side LCE 512 may transmit exceptions to exception handler 514.

Client-side LCE 512 may transmit synchronized processed data to execution hub 506. Execution hub 506 may reconcile the processed data against the job request. Execution hub 506 may update job status or update one or more databases. Execution hub 506 may use the message queue to communicate job completion to a stakeholder or a downstream application. Execution hub 506 may transmit processed data to one or more downstream applications.

Thus, methods and apparatus for a LIFI-POWERED CONTENT-AWARE LARGE-SCALE DATA PROCESSING FACTORY are provided. Persons skilled in the art will appreciate that the present invention can be practiced by other than the described embodiments, which are presented for purposes of illustration rather than of limitation, and that the present invention is limited only by the claims that follow.

What is claimed is:

1. One or more non-transitory computer-readable media storing computer-executable instructions which, when executed by a processor on a computer system, perform a method for centralized processing of large-scale, semi-structured data files via light fidelity (Lifi) transmission, the method comprising:

at a client computer comprising a client container and one or more containerized client-side applications:
  receiving a job associated with a semi-structured data file and generating file metadata associated with the job;
  prioritizing the job according to the metadata associated with the job;
  validating content of the semi-structured data file for compatibility with one or more LiFi transmission parameters;
  packetizing the semi-structured data according to a set of LiFi protocols and assigning a request identifier to the data;
  broadcasting the packets of semi-structured data to a server platform via LiFi using an LED array;
  receiving processed data from the server platform via LiFi using an array of photoreceptors; and
  synchronizing the processed data received from the server platform using the request identifier; and
at the server platform:
  receiving the packets of semi-structured data via LiFi from the containerized client-side applications using an array of photoreceptors;

synchronizing the received packets using the request identifier;

performing one or more processing operations on the received data;

packetizing the processed data according to a set of LiFi protocols; and broadcasting the packets of processed data to the containerized client-side applications via LiFi using an LED array.

2. The media of claim 1, further comprising reconciling processed data received by the containerized client-side applications with a job objective.

3. The media of claim 1, wherein validating the content of the semi-structured data file comprises extracting and validating XML headers and trailers.

4. The media of claim 1, further comprising validating the size and format of the semi-structured data file for compatibility with one or more LiFi transmission parameters.

5. The media of claim 1, wherein packetizing the semi-structured data comprises clustering the data based at least in part on the metadata associated with the job.

6. The media of claim 1, wherein the semi-structured data file is an XML file with a size greater than 16 gigabytes.

7. A method for centralized processing of large-scale semi-structured data files via light fidelity (Lifi) transmission, the method comprising:

at a client computer comprising a client container and one or more containerized client-side applications:

receiving a job associated with a semi-structured data file and generating file metadata associated with the job;

prioritizing the job according to the metadata associated with the job;

validating content of the semi-structured data file for compatibility with one or more LiFi transmission parameters;

packetizing the semi-structured data according to a set of LiFi protocols and assigning a request identifier to the file;

broadcasting the packets of semi-structured data to a server platform via LiFi using an LED array;

receiving the processed data from the server platform via LiFi using an array of photoreceptors; and synchronizing the processed data received from the server platform using the request identifier; and at the server platform:

receiving the packets of semi-structured data via LiFi from the containerized client-side applications using an array of photoreceptors;

synchronizing the received packets using the request identifier;

performing one or more processing operations on the received data;

packetizing the processed data according to a set of LiFi protocols; and broadcasting the packets of processed data to the containerized client-side applications via LiFi using an LED array.

8. The method of claim 7, further comprising reconciling processed data received by the client-side containerized applications with a job objective.

9. The method of claim 7, wherein validating the content of the semi-structured data file comprises extracting and validating XML, headers and trailers.

10. The method of claim 7, further comprising validating the size and format of the semi-structured data file for compatibility with one or more LiFi transmission parameters.

11. The method of claim 7, wherein packetizing the semi-structured data comprises clustering the data based at least in part on the metadata associated with the job.

12. The method of claim 7, wherein the semi-structured data file is an XML file with a size greater than 16 gigabytes.

* * * * *